US012198303B1

(12) United States Patent
Paik (10) Patent No.: US 12,198,303 B1
(45) Date of Patent: Jan. 14, 2025

(54) TRAINING DATA GENERATION METHOD AND APPARATUS FOR ARTIFICIAL INTELLIGENCE VISUAL ANALYSIS MODEL

(71) Applicant: CHUNG ANG UNIVERSITY INDUSTRY ACADEMIC COOPERATION FOUNDATION, Seoul (KR)

(72) Inventor: Joon Ki Paik, Seoul (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 0 days.

(21) Appl. No.: 18/786,223

(22) Filed: Jul. 26, 2024

Related U.S. Application Data

(63) Continuation of application No. PCT/KR2023/021577, filed on Dec. 26, 2023.

(30) Foreign Application Priority Data

Nov. 8, 2023 (KR) .................. 10-2023-0153771

(51) Int. Cl.
*G06T 5/50* (2006.01)
*G06T 3/40* (2006.01)
(Continued)

(52) U.S. Cl.
CPC ............ *G06T 5/50* (2013.01); *G06T 3/40* (2013.01); *G06T 7/50* (2017.01); *G06V 10/762* (2022.01);
(Continued)

(58) Field of Classification Search
None
See application file for complete search history.

(56) References Cited

U.S. PATENT DOCUMENTS 11,568,544 B2 * 1/2023 Lin .................. G06N 3/04
2023/0169671 A1 * 6/2023 Jung ................. G06V 10/82
382/154

FOREIGN PATENT DOCUMENTS

KR   10-2018-0046803 A    5/2018
KR   10-2022-0149929 A   11/2022
(Continued)

OTHER PUBLICATIONS

International search report of PCT/KR2023/021577 dated Jul. 26, 2024.
(Continued)

*Primary Examiner* — Leon Viet Q Nguyen (57) ABSTRACT

Disclosed are a training data generation method and apparatus for an artificial intelligence visual analysis model. The training data generation method includes: (a) receiving a background image and object-related information; (b) generating a target object image that meets a condition based on the object-related information; (c) applying the background image to a depth estimation model to estimate depths of each pixel location and generate a depth map; (d) determining an insertion location and scale at which the target object image is inserted based on the depth map to generate a local object insertion image and a mask image, respectively; (e) simply synthesizing the local object insertion image and the background image and then generating a synthesis image reflecting a scale feature of the background image through a trained multi-scale visual analysis model; and (f) generating a final training image using the background image, the synthesis image, and the mask image.

19 Claims, 10 Drawing Sheets

(51) Int. Cl.
*G06T 7/50* (2017.01)
*G06V 10/762* (2022.01)
*G06V 10/771* (2022.01)

(52) U.S. Cl.
CPC .. *G06V 10/771* (2022.01); *G06T 2207/20221* (2013.01)

(56) References Cited

FOREIGN PATENT DOCUMENTS

| KR | 10-2023-0078433 A | 6/2023 |
| KR | 102571457 B1 | 8/2023 |
| KR | 10-2023-0133059 A | 9/2023 |

OTHER PUBLICATIONS

Written Opinion Of the international searching authority of PCT/KR2023/021577dated Jul. 26, 2024.
Notification of Preliminary Examination Results from Korean Intellectual Property Office for KR Patent Application No. 10-2023-0153771 dated Dec. 18, 2023.
Notice of Decision to Grant a Patent from Korean Intellectual Property Office for KR Patent Application No. 10-2023-0153771 dated Jul. 16, 2024.

* cited by examiner

TRAINING DATA GENERATION METHOD AND APPARATUS FOR ARTIFICIAL INTELLIGENCE VISUAL ANALYSIS MODEL

CROSS-REFERENCE TO RELATED APPLICATION

This application is a bypass continuation of pending PCT International Application No. PCT/KR2023/021577, which was filed on Dec. 26, 2023, and which claims priority to Korean Patent Application No. 10-2023-0153771 which was filed in the Korean Intellectual Property Office on Nov. 8, 2023. The disclosures of which are hereby incorporated by reference in their entireties.

TECHNICAL FIELD

The present disclosure relates to a training data generation method and apparatus for an artificial intelligence visual analysis model.

BACKGROUND ART

Representative artificial intelligence-based object detection technologies include a region-based convolutional neural network (R-CNN), faster R-CNN, and YOLO, etc. The R-CNN includes a region proposal stage that estimates an object location in an image and a classification stage that classifies an object type. The faster R-CNN integrates the region proposal and classification stage into one network to increase processing speed. In addition, the YOLO announced in 2016 is a model that processes the entire image at once to detect objects, and contributes to increasing the processing speed and implementation efficiency.

The performance of the YOLO has continuously improved through version update, but as the performance of the YOLO has improved, the complexity of the network has increased. A lot of training data is required to train the complex network, but in actual application fields, it is difficult to obtain the training data, and simple and inexpensive networks are often needed.

For example, when the YOLO is used in an autonomous car to detect vehicles, pedestrians, and traffic lights, a model that may detect various types of vehicles, pedestrians, and traffic lights is required since vehicles drive in a variety of environments. However, a lot of training data is required to detect various types of objects, and at the same time, complex networks may not be used due to the requirement to detect objects in real time. In addition to these deep learning-based object detection models, the application environment for image analysis models such as object tracking and segmentation is also similar.

Therefore, in order to effectively perform the visual analysis using the artificial intelligence model in various application fields, it is very important to easily generate training data for each field.

DISCLOSURE

Technical Problem

It is an object of the present disclosure to provide a training data generation method and apparatus for an artificial intelligence visual analysis model.

It is another object of the present disclosure to provide a method and apparatus capable of generating data for training an artificial intelligence visual analysis model even in environments that are difficult to access, such as military facilities or hazardous areas.

It is still another object of the present disclosure to provide a training data generation method and apparatus for an artificial intelligence visual analysis model that can lighten the model because it provides the training data for the artificial intelligence visual analysis model that is used limitedly in special environments, and can also be applied to an embedded system.

Technical Solution

According to an aspect of the present disclosure, there is provided a training data generation method for an artificial intelligence visual analysis model.

According to an embodiment of the present disclosure, there is provided a training data generation method for an artificial intelligence visual analysis model, including: (a) receiving a background image and object-related information; (b) generating a target object image that meets a condition based on the object-related information; (c) applying the background image to a depth estimation model to estimate depths of each pixel location and generate a depth map; (d) determining an insertion location and scale at which the target object image is inserted based on the depth map to generate a local object insertion image and a mask image, respectively; (e) simply synthesizing the local object insertion image and the background image and then generating a synthesis image reflecting a scale feature of the background image through a trained multi-scale visual analysis model; and (f) generating a final training image using the background image, the synthesis image, and the mask image.

The object-related information may include an object image and a description of an object, and the description may include a description prompt for the object and at least one condition.

The depth estimation model may extract a background feature map for the background image, apply a normalization layer to normalize the extracted background feature map, and then apply a channel splitting operation to split channels, respectively, apply a multi-layer perceptron neural network model to the channel-split background feature map to estimate a pixel-wise depth feature map, and apply a channel shuffling operation to the estimated pixel-wise depth feature map and the channel-split background feature map, and mix and then combine the estimated pixel-wise depth feature map and the channel-split background feature map to generate a final depth map.

The step (d) may include: determining the insertion location where the target object image is inserted into a space corresponding to the background image; scaling the target object image according to a depth value corresponding to the insertion location based on the depth map; inserting the scaled target object image into the insertion location in a space corresponding to the background image to generate the local object insertion image; and generating the mask image using the local object insertion image.

The mask image may have information about where and at what size the target object image is inserted into the background image.

The step (d) may be repeatedly performed according to different insertion locations and different scales.

The multi-scale visual analysis model may include a plurality of scale image generation blocks that receive an image obtained by up-sampling an image generated from a lower scale image generation block by r times, divide the received image into clusters with no pixel overlap, and then apply a self-attention operation to extract a cluster-level feature map, and apply a random mask to generate a scale generation image; and a plurality of discrimination blocks that adjust a weight of a generator block located in the scale image generation block to discriminate between a background image and the scale generation image down-sampled r times, and the multi-scale visual analysis module may be pre-trained using the background image.

The plurality of scale image generation blocks may have image generation blocks and discrimination blocks for different scales, and the same-scale image generation blocks and discrimination blocks may be composed of pairs.

An N-order scale image generation block, which has a lowest resolution among the plurality of scale image generation blocks, may receive an N-order random noise image $z_N$ and then generate an N-order generation image $\hat{x}_N$ similar to the background image, and a 0-order discrimination block with a highest resolution among the plurality of discrimination blocks may adjust the weight of the generator block within the 0-order scale image generation block using the background image and the 0-order scale generation image $\hat{x}_0$ that are not down-sampled.

Each of the plurality of scale image generation blocks (for example, n-order block, $\hat{G}_n$, n=0, ... N-1) may include: a context attention block that receives a one-level lower scale generation image $\hat{x}_{n+1}^r$ and then applies a simple linear iterative clustering algorithm to divide the received one-level lower scale generation image $\hat{x}_{n+1}^r$ into clusters with no pixel overlap, applies a convolution operation within each cluster to perform embedding into a feature space, applies a K-proximity algorithm to perform clustering, and then sets a centroid vector of a t-th superpixel, performs feature aggregation with the number of clustered samples to calculate the aggregated centroid vector, and performs a self-attention operation and then transmits a feature of the centroid vector aggregated through a dispatching operation to each cluster by an element-wise sum to extract the cluster-level feature map; a random mask block that is located at a rear stage of the context attention block, receives the cluster-level feature map as an output of the context attention block, and then extracts a randomly masked feature map through patch embedding and random masking; and a target scale generator block that receives an image obtained by summing the masked feature map as the output of the random mask block and a target scale random noise image, extracts a target scale feature map, assigns a weight to each channel and locally important feature, and then sums the one-level lower scale generation image $\hat{x}_{n+1}^r$ to train a target scale feature.

In the step (e), the simply synthesized image may be down-sampled to an N-order scale, which is a preset lowest scale, and input to the trained multi-scale visual analysis model, the trained multi-scale visual analysis model may receive an image down-sampled to the N-order scale, divide the received image into clusters with no pixel overlap, apply the self-attention operation to extract a target scale cluster-level feature map, and then generate a target scale synthesis image that reflects a target scale feature pre-trained for the background image, and the multi-scale visual analysis model may up-sample the target scale synthesis image by r times and repeat the synthesis image generation process, but repeatedly perform the synthesis image generation process until the scale of the target scale synthesis image becomes the same as the background image.

According to another aspect of the present disclosure, there is provided a training data generation apparatus for an artificial intelligence visual analysis model.

According to an embodiment, a computing device may include: a memory that stores at least one instruction; and a processor that executes the instruction stored in the memory, in which each of the instructions executed by the processor may perform: (a) receiving a background image and object-related information; (b) generating a target object image that meets a condition based on the object-related information; (c) applying the background image to a depth estimation model to estimate depths of each pixel location and generate a depth map; (d) determining an insertion location and scale at which the target object image is inserted based on the depth map to generate a local object insertion image and a mask image, respectively; (e) simply synthesizing the local object insertion image and the background image and then generating a synthesis image reflecting a scale feature of the background image through a trained multi-scale visual analysis model; and (f) generating a final training image using the background image, the synthesis image, and the mask image.

Advantageous Effects

According to an embodiment of the present disclosure, by providing the training data generation method and apparatus for an artificial intelligence visual analysis model, even in difficult-to-access environments such as military facilities or hazardous areas, it is possible to generate data for training the artificial intelligence visual analysis model.

In addition, since the present disclosure trains the artificial intelligence visual analysis model that is used limitedly in special environments, the present disclosure can lighten the model and can also be applied to the embedded system.

BEST MODE

In the present specification, singular forms include plural forms unless the context clearly indicates otherwise. In the specification, the terms "composed of" or "include," and the like, should not be construed as necessarily including all of several components or several steps described in the specification, and it should be construed that some component or some steps among them may not be included or additional components or steps may be further included. In addition, the terms " . . . unit", "module", and the like disclosed in the specification refer to a processing unit of at least one function or operation and this may be implemented by hardware or software or a combination of hardware and software.

Hereinafter, embodiments of the present disclosure will be described in detail with reference to the accompanying drawings.

Figure 1:
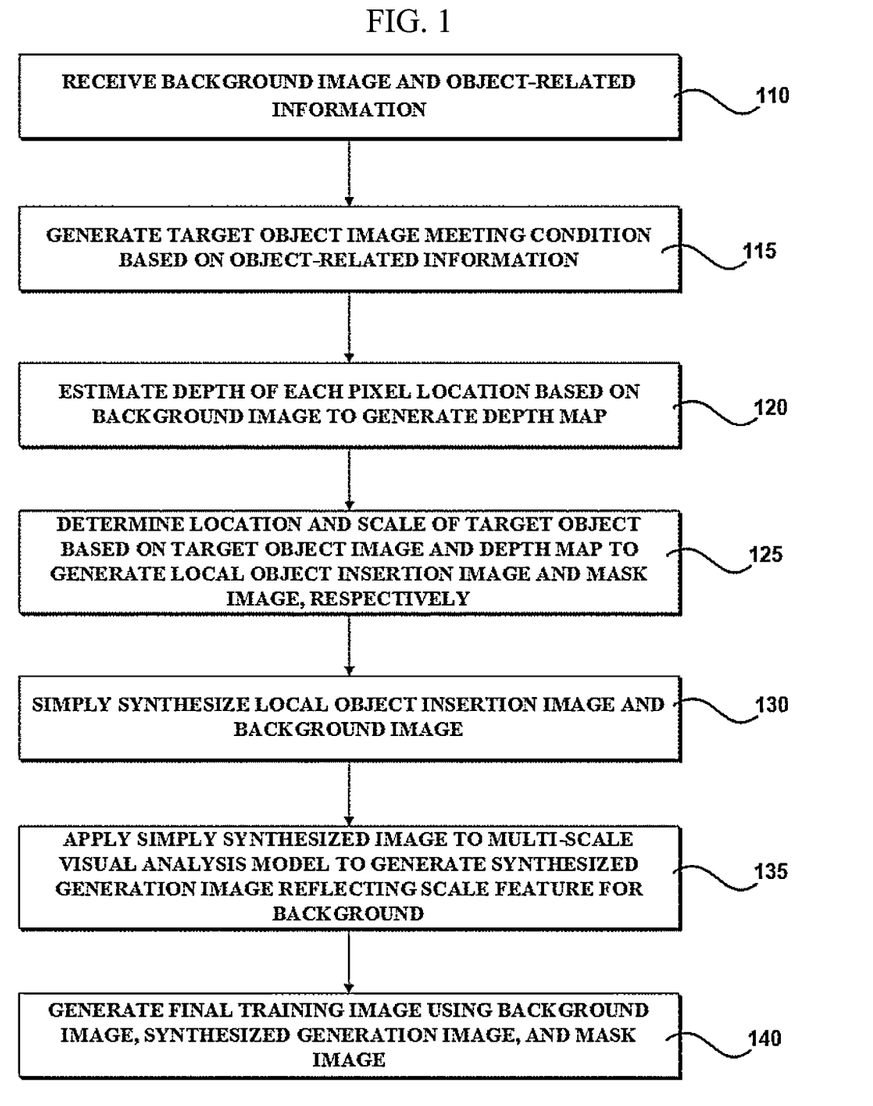
FIG. 1 is a flowchart illustrating a method of generating training data for an artificial intelligence visual analysis model according to an embodiment of the present disclosure.
Figure 2:
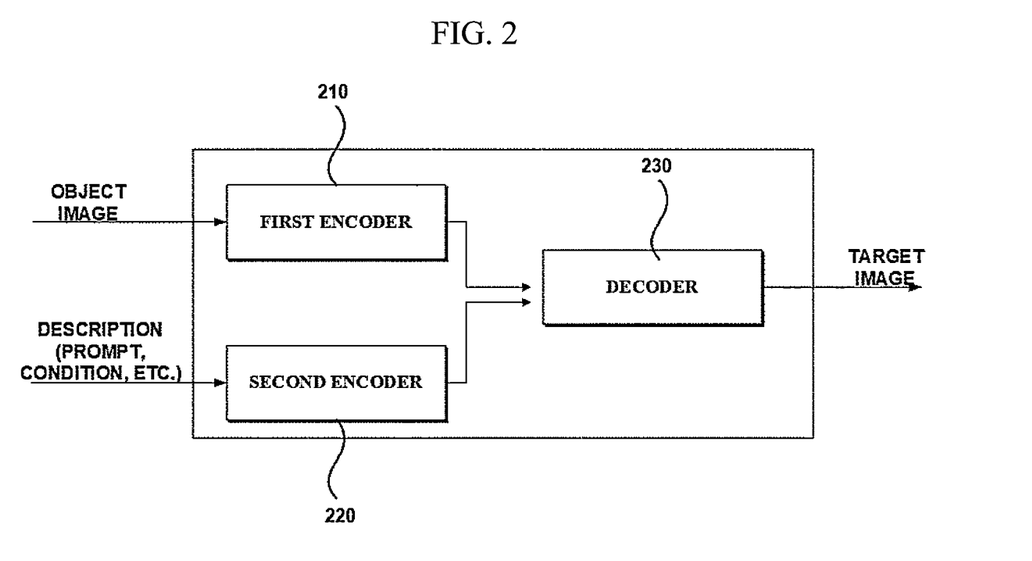
FIG. 2 is a diagram illustrating the configuration of an object generation model according to an embodiment of the present disclosure.
Figure 3:
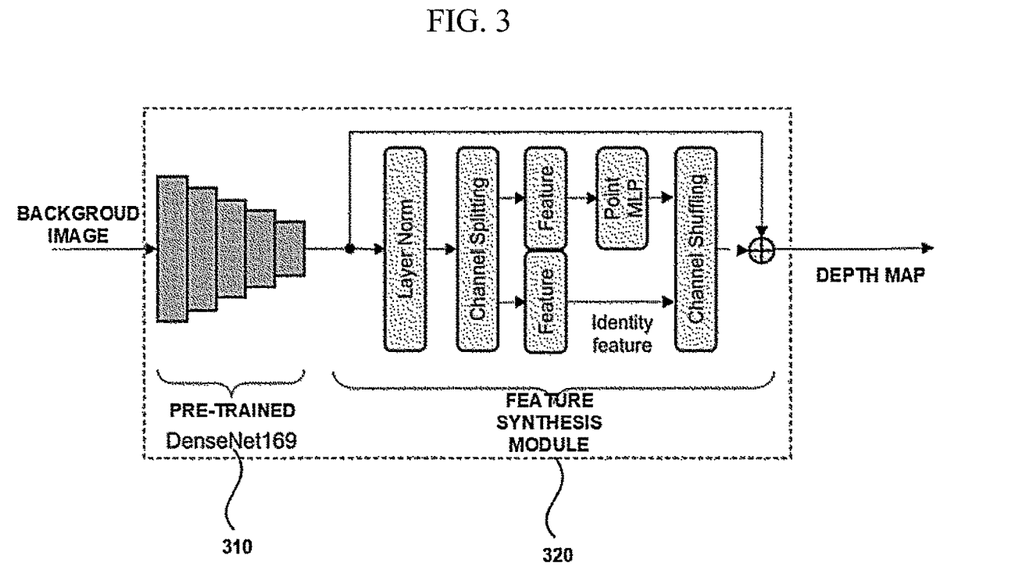
FIG. 3 is a diagram illustrating a configuration of a depth estimation model according to an embodiment of the present disclosure.
Figure 4:
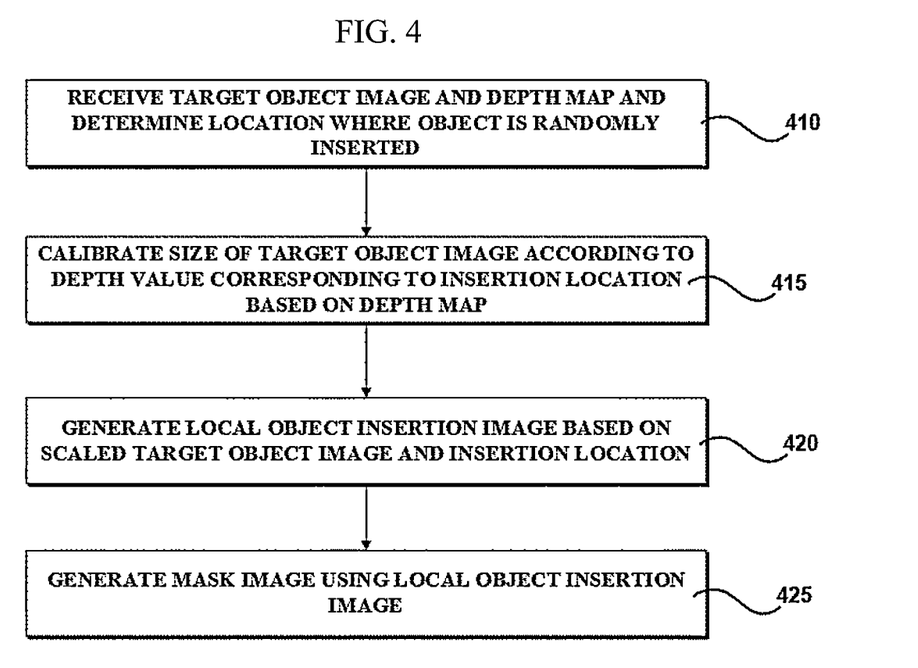
FIG. 4 is a flowchart illustrating a method for generating a local object insertion image and a mask image according to an embodiment of the present disclosure.
Figure 5:
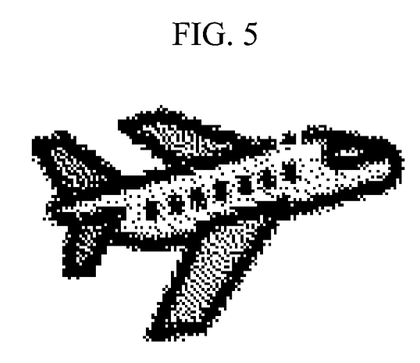
FIG. 5 is a diagram illustrating a target object image according to an embodiment of the present disclosure.
Figure 6:
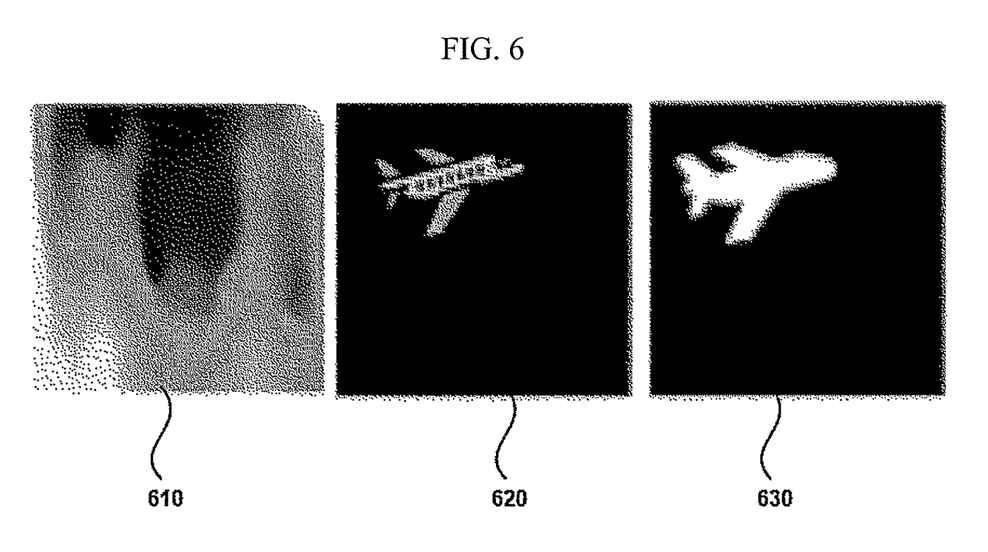
FIG. 6 is a diagram illustrating a depth map, a synthesis image, and a mask image of a background image according to an embodiment of the present disclosure.
Figure 7:
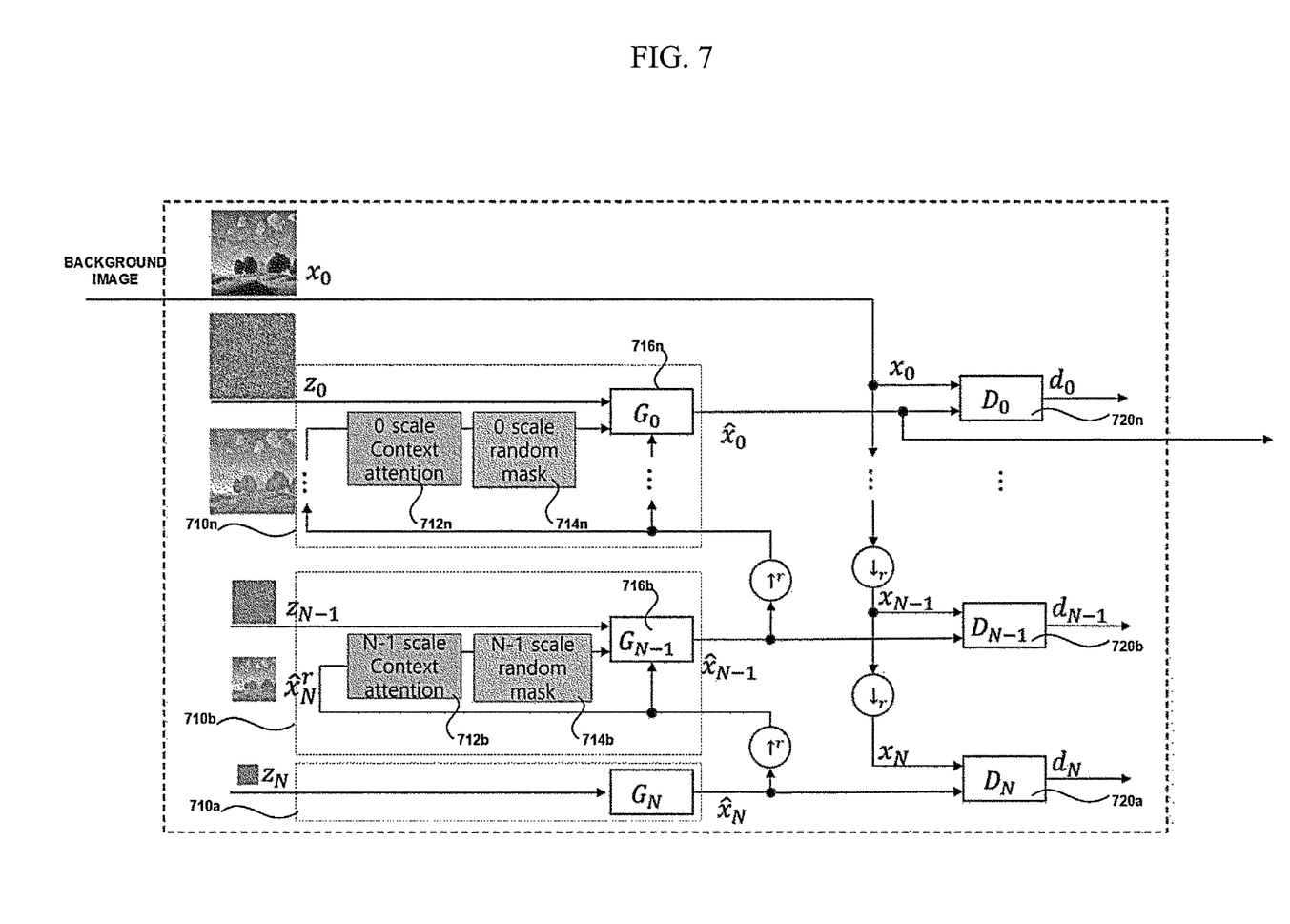
FIG. 7 is a diagram illustrating a process of training a multi-scale visual analysis model according to an embodiment of the present disclosure.
Figure 8:
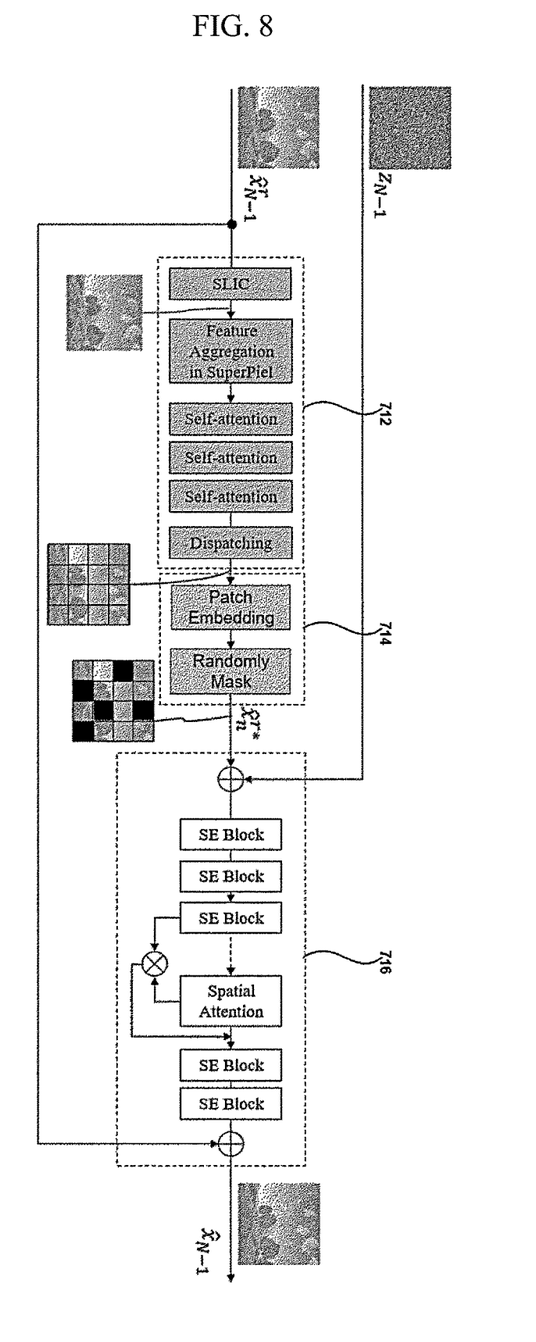
FIG. 8 is a diagram illustrating a detailed structure of a scale image generation block according to an embodiment of the present disclosure.
Figure 9:
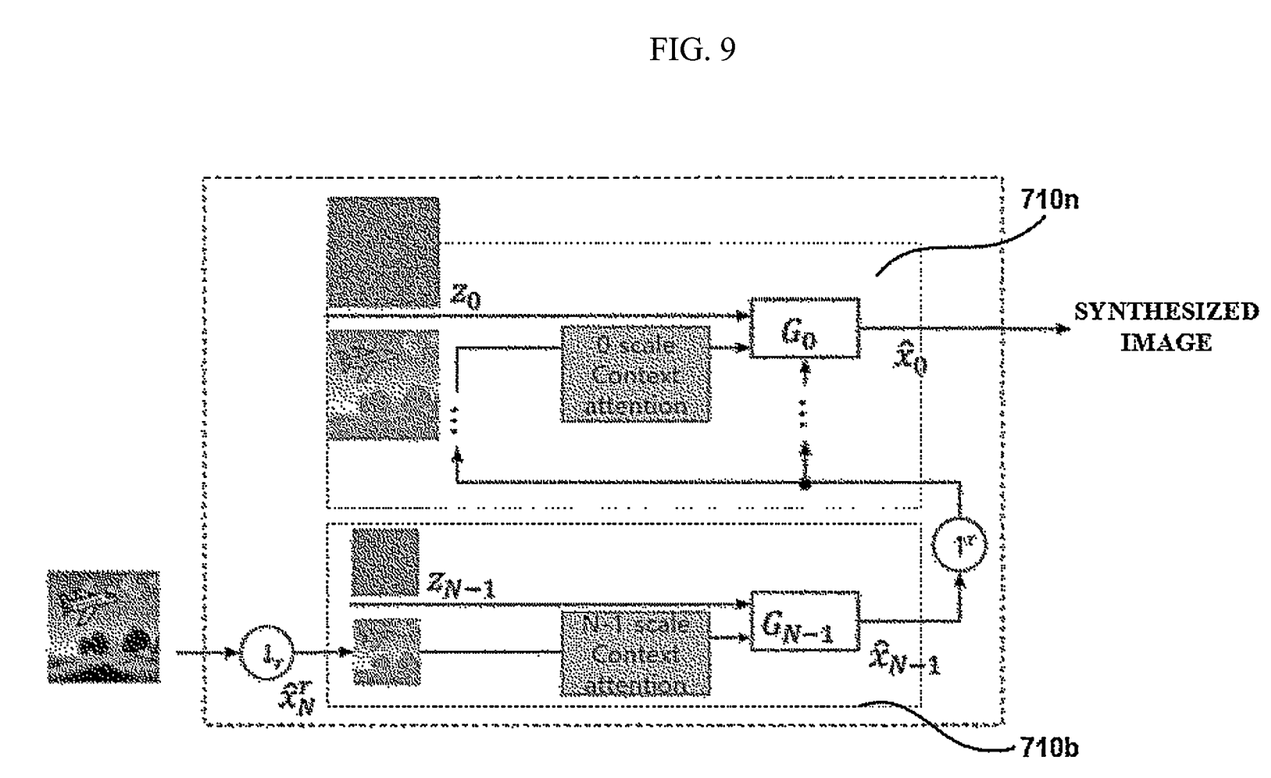
FIG. 9 is a diagram illustrating a process of generating a synthesis image of a multi-scale visual analysis model in which features of various sizes are analyzed according to an embodiment of the present disclosure.

FIG. 1 is a flowchart illustrating a method of generating training data for an artificial intelligence visual analysis model according to an embodiment of the present disclosure, FIG. 2 is a diagram illustrating the configuration of an object generation model according to an embodiment of the present disclosure, FIG. 3 is a diagram illustrating a configuration of a depth estimation model according to an embodiment of the present disclosure, FIG. 4 is a flowchart illustrating a method for generating a local object insertion image and a mask image according to an embodiment of the present disclosure, FIG. 5 is a diagram illustrating a target object image according to an embodiment of the present disclosure, FIG. 6 is a diagram illustrating a depth map, a synthesis image, and a mask image of a background image according to an embodiment of the present disclosure, FIG. 7 is a diagram illustrating a process of training a multi-scale visual analysis model according to an embodiment of the present disclosure, FIG. 8 is a diagram illustrating a detailed structure of a scale image generation block according to an embodiment of the present disclosure, and FIG. 9 is a diagram illustrating a process of generating a synthesis image of a multi-scale visual analysis model in which features of various sizes are analyzed according to an embodiment of the present disclosure.

Figure 10:
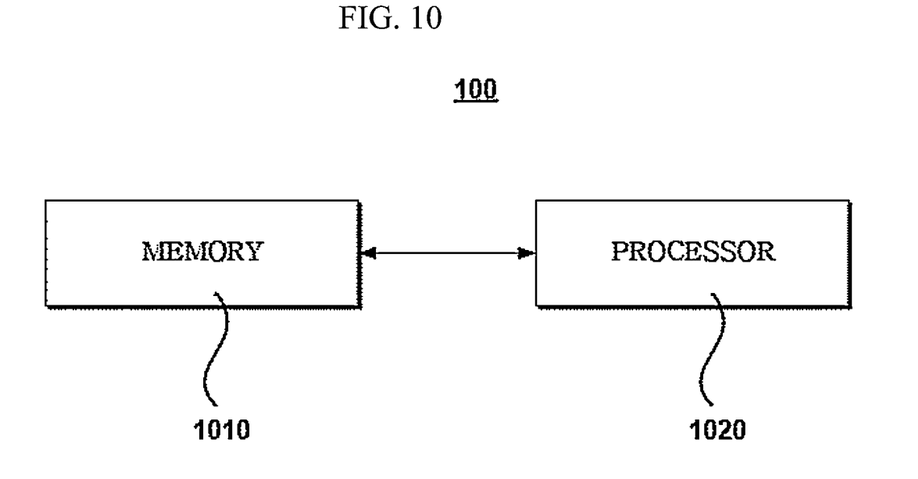
FIG. 10 is a diagram schematically illustrating an internal configuration of a computing device for generating training data for an artificial intelligence visual analysis model according to an embodiment of the present disclosure.

In step 110 of FIG. 1, a computing device 100 of FIG. 10 receives a background image and object-related information.

Here, the object-related information may be at least one of an object image and a description of an object. Here, the description of the object may include a prompt (text) describing the object to be generated and one or more conditions (for example, a posture of the object, etc.).

In step 115, the computing device 100 applies the object-related information to an object generation model to generate a target object image. FIG. 2 shows an example of an object generation model. Referring to FIG. 2, the object generation model is configured to include a first encoder 210, a second encoder 220, and a generation decoder 230.

One of the first encoder 210 and the second encoder 220 may be an encoder that processes the image, and the other may be an encoder that processes the description. In an embodiment of the present disclosure, the description is made assuming that the first encoder 210 is the encoder that processes the image, and the second encoder 220 is the encoder that processes the description.

The first encoder 210 is a means for receiving an object image among the object-related information and then extracting an object feature map. Here, the object feature map may be a synthetic neural network-based feature map.

The second encoder 220 is a means for receiving a description and then extracting a condition feature map. The second encoder 220 has a feature extraction network for each condition domain for a plurality of conditions, and may extract each condition domain feature map through feature extraction networks for each condition domain.

The generation decoder 230 may generate a target object image that meets the conditions using at least one of the object feature map and the condition domain feature map.

In this way, the computing device 100 may extract at least one of the object feature map and the condition domain feature map through at least one of a plurality of encoders using the object-related information, and uses at least one of the extracted object feature map and condition domain feature map to generate the target object image suitable for the conditions.

In step 120, the computing device 100 applies the background image to a depth estimation model to estimate the depths of each pixel location and generate a depth map.

This will be described in more detail with reference to FIG. 3.

The depth estimation model may be composed of a feature extraction module 310 and a feature synthesis module 320. The feature extraction module 310 may be a DenseNet-169-based model. The feature extraction module 310, which is the DenseNet-169-based model, can build a deep network by connecting all layers in a dense block, and combine a low-level feature map and a high-level feature map to extract an enhanced feature map. In an embodiment of the present disclosure, the description is made assuming that the feature extraction module 310 is the DenseNet-169-based model, but other models (for example, encoder) may also be applied.

The feature extraction module 310 may receive the background image and then extract a feature map as perceptual information through the DenseNet-169-based encoder.

The feature synthesis module 320 may split the feature map input from the feature extraction module 310 and then generate a pixel-wise depth feature map.

The feature synthesis module 320 may apply a normalization layer to the feature map input from the feature extraction module 310 to normalize the feature map, and then apply a channel splitting operation to the feature map to split channels of the feature map, respectively. Next, the feature synthesis module 320 may apply a multi-layer perceptron neural network model to the channel-split feature map to estimate a pixel-wise depth feature map. Here, the multi-layer perceptron neural network model may be PointMLP. The feature synthesis module 320 may apply a channel shuffling operation to the estimated pixel-wise depth feature map and channel-split feature map, mix the estimated pixel-wise depth feature map and channel-split feature map, and then combine the estimated pixel-wise depth feature map and channel-split feature map to output a final depth map.

In step 125, the computing device 100 determines a location and scale of the target object based on the target object image and the depth map and then generates a local object insertion image and a mask image, respectively.

FIG. 4 illustrates a process of generating the local object insertion image and the mask image.

In step 410, the computing device 100 receives the target object image and the depth map and then determines a location where the object (for convenience, referred to as an insertion location) will be randomly inserted.

Next, in step 415, the computing device 100 scales a size of the target object image (that is, the target object) according to the depth value (depth value of the depth map) corresponding to the determined insertion location.

In step 420, the computing device 100 generates the local object insertion image based on the scaled object and insertion location. Here, the size of the local object insertion image may be the same as the background image or the depth map. That is, by inserting the scaled target object image into the insertion location of the space corresponding to the background image, it is possible to generate the local object insertion image in which the target object is localized and scaled.

In step 425, the computing device 100 generates the mask image corresponding to the local object insertion image. Here, the mask image is an image in which the object and the background are binary separated in the local object insertion image. For example, a pixel value of the object area may have a first value, and a pixel value of the background area may have a second value.

Accordingly, the mask image has information about where and at what size the target object image is inserted (synthesized) in the background image and may be used as a training label.

For example, it will be assumed that the target object image is as illustrated in FIG. 5. In this case, 610 in FIG. 6 may indicate a depth map generated based on the background image. The local object insertion image generated by scaling the target object image and reflecting the depth value into which the target object image of FIG. 5 will be inserted is same as 620, and the mask image indicating the insertion location and size of the target object image in the local object insertion image may be generated like 630.

In FIG. 4, the description is made assuming that the target object image is inserted at one location, but the process of FIG. 4 may be repeatedly performed on a plurality of insertion locations. In addition, it is natural that scaling of a target object for one location is not considered only to one size, but the target object may be scaled to various sizes.

That is, the computing device 100 may generate a plurality of local object insertion images and a mask image, respectively, through determination of insertion location and scaling to enable synthesis of target object images at various locations within the background image.

In step 130, the computing device 100 simply syntheses the local object insertion image and the background image to generate the simply synthesized image.

In step 135, the computing device 100 may down-sample a simply synthesized image to a preset N-order scale and then apply the down-sampled image to the trained multi-scale visual analysis model to generate a synthesis image reflecting the scale features of the background image.

The multi-scale visual analysis model is pre-trained, but for convenience of understanding and description, the process of training the multi-scale visual analysis model will first be described with reference to FIG. 7.

The multi-scale visual analysis model is based on a generative adversarial model.

Referring to FIG. 7, the multi-scale visual analysis model is configured to include a plurality of scale image generation blocks 710a to 710n and a plurality of discrimination blocks 720a to 720n. Here, the scale image generation block and the discrimination block may be composed of a pair of the scale image generation block and the discrimination block that process images of the same scale. Although there is no separate description below, the first scale image generation block 710a and the first discrimination block 720a may be operated as a pair, and the n-th scale image generation block 710n and the n-th discrimination block 720n may be operated as a pair.

Hereinafter, the expression of the lower scale should be understood as a scale (resolution) one level lower than the image scale (resolution) processed in the current scale image generation block or discrimination block, and the expression of the higher scale should be understood as a scale (resolution) one level higher.

In addition, the resolution (scale) processed in the current processing block (for example, a scale image generation block or discrimination block) will be referred to as the target scale to be discriminated from the lower and higher expressions. Therefore, the target scale expression should be understood as the specified scale (resolution) of the currently processed block (for example, scale image generation block or discrimination block).

As illustrated in FIG. 7, the multi-scale visual analysis model according to an embodiment of the present disclosure may include the plurality of scale image generation blocks 710a to 710n and the plurality of discrimination blocks 720a to 720n that process images at different scales.

Hereinafter, a method in which the multi-scale visual analysis model allows each scale image generation block to train the target scale feature using a single image (for example, background image) will be described with reference to FIG. 7.

According to an embodiment of the present disclosure, for the plurality of scale image generation blocks, the lower scale image generation block is operated first, and then the higher scale image generation block is operated sequentially, so that it may be performed repeatedly up to the highest scale image generation block.

For convenience of understanding and description, the smallest scale image generation block will be referred to as the N-order scale image generation block 710a, and the highest scale image generation block will be referred to as the 0-order scale image generation block 710n.

For training the multi-scale visual analysis model, the N-order scale image generation block 710a may receive the N-order scale random noise image $z_N$ and then generate the N-order generation image $\hat{x}_N$ similar to the background image. Subsequently, the computing device 100 may up-sample the N-order generation image $\hat{x}_N$ by r times an transmit the up-sampled N-order generation image $\hat{x}_N$ to the higher scale image generation block (for example, the N−1-order scale image generation block 710b).

The remaining scale image generation blocks 710b to 710n excluding the N-order scale image generation block are configured to include a context attention block 712, a random mask block 714, and a generator block 716, respectively, as illustrated in FIG. 8.

The context attention block 712 may receive an image obtained by up-sampling an output result of the lower scale image generation block by r times, divides the received image into clusters with no pixel overlap, and then applies the self-attention operation to the received image to extract a cluster-level feature map.

In more detail, the context attention block 712 converts the image obtained by up-sampling the output result of the lower scale image generation block by r times into a normalized coordinate space $$\left[\frac{i}{\omega} - 0.5, \frac{j}{h} - 0.5\right]$$

and then converts each pixel into a data point $p_{n,k} \in \mathbb{R}^{d+2}$. Here, d• represents the feature dimension of the input, and 2 represents a pixel coordinate.

Next, the context attention block 712 may apply a simple linear iterative clustering (SLIC) algorithm to divide pixel into clusters with no pixel overlap. Next, the context attention block 712 may apply a convolutional layer within each cluster to perform embedding into a feature space, use a K-nearest neighbor (KNN) algorithm to perform clustering, set a centroid vector $C_t$ of a t-th superpixel $S_t$, and then perform feature aggregation with M clustering samples to calculate the aggregated centroid vector $\tilde{C}_t$. In addition, the context attention block 712 applies a self-attention operation to perform an attention operation between each cluster and then transmits a feature of a representative vector to each cluster as an element-wise sum through a dispatching operation to output a cluster-level feature map.

The random mask block 714 is located at a rear stage of the context attention block 712, and may receive the cluster-level feature map output from the context attention block 712 to extract a randomly masked feature map through patch embedding and random masking.

The output of the random mask block 714 and the target scale random noise image may be summed and transmitted to the generator block 716. The generator block 716 may receive an image obtained by summing the output of the random mask block 714 and the target scale random noise image, and extract and train the target scale feature map.

The target scale feature map may be assigned a weight to focus on locally important features and channels of the target scale feature map through an SE block and a spatial-attention block. Here, the SE block may include two processes: squeeze and excitation. By summing the image obtained by up-sampling the output result of the lower scale image generation block by r times to the feature map that passes through the SE block and the spatial attention block, it is possible to train the trainable features at the target scale.

In this way, it is performed repeatedly from the N−1-order scale image generation block to the 0-order scale image generation block, and as a result, the generator blocks of each scale may train global structural features of the image at the smallest size. The closer to the 0-order scale, the more detailed features may be trained.

The multi-scale visual analysis model according to an embodiment of the present disclosure has image generation blocks for each different scale, and as a result, features for each different scale may be pre-trained using a single background image.

To summarize again, the scale image generation blocks 710b and 710n may up-sample the image generated from the lower scale image generation block by r times to receive the up-sampled image, divide the up-sampled image into clusters with no pixel overlap, apply the self-attention operation to extract the cluster-level feature map, and then generate a target scale image similar to the input background image using the feature map randomly masked through the random mask block. It may be performed repeatedly until the highest scale image (0-order scale image) is generated.

In addition, in order to train the 0-order scale generation block 710n, the input background image $x_0$ and the 0-order scale image $\hat{x}_0$ are compared to optimize the weight of the 0-order generator block 716n so that the corresponding discrimination block 720n forming the pair does not discriminate the input background image and the generated image. Likewise, the remaining discrimination blocks 720n-1, 720n-2, . . . , 720a may optimize the weight of the generator block within each target scale image generation block forming each pair to prevent the down-sampled input background image from being discriminated from the generated image.

Referring to FIGS. 7 and 8, the process of training a multi-scale visual analysis model based on the input background image was described.

FIGS. 7 and 8 illustrate the operation of training the multi-scale visual analysis model using the single image (background image), and a method of generating a synthesized image using a trained multi-scale visual analysis model will be described with reference to FIG. 9. As illustrated in FIG. 9, in the multi-scale visual analysis model for which the training has been completed, some components used in the training process are deactivated and may not operate. For example, the lowest scale image generation block 710a, each random mask block 714a to 714n in the remaining scale image generation blocks, and the lowest scale discrimination block 720a may be used only in the training process and after the training is completed, may be removed or deactivated, and thus may not be used to generate the synthesized image.

The simply synthesized image is down-sampled to the smallest preset scale (for convenience, N-order scale) and then transmitted to the target scale image generation block. In an embodiment of the present disclosure, the description is made assuming that the simply synthesized image is down-sampled to the N-order scale, but the simply synthesized image may be scaled randomly from 0-order to N-order scales.

Since it is assumed that the simply synthesized image is down-sampled to the N-order scale, the corresponding image may be input to the higher scale image generation block (e.g., an N−1-order scale image generation block) than the image down-sampled to the N-order scale. Accordingly, the context attention block located in the target scale image generation block 710b divides the input image into clusters with no pixel overlap and then applies the self-attention operation to transmit features of a representative vector to each cluster by the element-wise sum through the dispatching operation, thereby extracting the cluster-level feature map and transmitting the extracted cluster-level feature map to the generator block.

The generator block may reflect the target scale trained for the background image in the cluster-level feature map to generate the target scale synthesis image. The target scale synthesis image may be up-sampled by r times and transmitted to the higher scale image generation block, and the above-described series of processes may be repeatedly performed until the 0-order scale synthesis image is generated.

Referring back to FIG. 1, in step 140, the computing device 100 generates the final training image using the background image, the final synthesis image, and the mask image.

FIG. 10 is a diagram schematically illustrating an internal configuration of a computing device for generating training data for an artificial intelligence visual analysis model according to an embodiment of the present disclosure.

Referring to FIG. 10, the computing device 100 for the generating deep learning model training data according to an embodiment of the present disclosure is configured to include a memory 1010 and a processor 1020.

The memory 1010 stores at least one instruction.

The processor 1020 may be linked to the memory 1010 to execute the instruction stored in the memory 1010. The instruction executed by the processor 1020 may perform a series of processes of receiving the background image and the object-related information, generating the target object image that meets the condition based on the object-related information, applying the background image to the depth estimation model to estimate the depths of each pixel location and generate the depth map, determining the insertion location and scale at which the target object image is inserted based on the depth map to generate the local object insertion image and the mask image, respectively, simply synthesizing the local object insertion image and the background image and then generating a synthesis image reflecting the scale feature of the background image through the trained multi-scale visual analysis model, and generating the final training image using the background image, the synthesis image, and the mask image. This is the same as what is described with reference to FIGS. 1 to 9, and therefore, redundant description will be omitted.

The apparatus and the method according to the embodiment of the present disclosure may be implemented in a form of program commands that may be executed through various computer means and may be recorded in a computer-readable recording medium. The computer-readable recording medium may include a program command, a data file, a data structure, or the like, alone or in a combination thereof. The program commands recorded in the computer-readable recording medium may be especially designed and constituted for the present disclosure or be known to and usable by those skilled in a field of computer software. Examples of the computer-readable recording medium may include magnetic media such as a hard disk, a floppy disk, and a magnetic tape; optical media such as a compact disk read only memory (CD-ROM) or a digital versatile disk (DVD); magneto-optical media such as a floptical disk; and a hardware device specially configured to store and execute program commands, such as a ROM, a random access memory (RAM), a flash memory, or the like. Examples of the program commands include a high-level language code capable of being executed by a computer using an interpreter, or the like, as well as a machine language code made by a compiler.

The above-mentioned hardware device may be constituted to be operated as one or more software modules in order to perform an operation according to the present disclosure, and vice versa.

Hereinabove, the present disclosure has been described with reference to exemplary embodiments thereof. It will be understood by those skilled in the art to which the present disclosure pertains that the present disclosure may be implemented in a modified form without departing from essential characteristics of the present disclosure. Therefore, the exemplary embodiments disclosed herein should be considered in an illustrative aspect rather than a restrictive aspect. The scope of the present disclosure should be defined by the claims rather than the above-mentioned description, and all differences within the scope equivalent to the claims should be interpreted to fall within the present disclosure.

The invention claimed is:

1. A training data generation method for an artificial intelligence visual analysis model performed in a computing device, comprising:
   (a) receiving a background image and object-related information input;
   (b) generating a target object image that meets a condition based on the object-related information;
   (c) applying the background image to a depth estimation model to estimate depths of each pixel location and generate a depth map;
   (d) determining an insertion location and scale at which the target object image is inserted based on the depth map to generate a local object insertion image and a mask image, respectively;
   (e) simply synthesizing the local object insertion image and the background image and then generating a synthesis image reflecting a scale feature of the background image through a trained multi-scale visual analysis model; and
   (f) generating a final training image using the background image, the synthesis image, and the mask image.

2. The training data generation method of claim 1, wherein the object-related information comprises an object image and a description of an object, and
   the description comprises a description prompt for the object and at least one condition.

3. The training data generation method of claim 1, wherein the depth estimation model extracts a background feature map for the background image, applies a normalization layer to normalize the extracted background feature map, and then applies a channel splitting operation to split channels, respectively, applies a multi-layer perceptron neural network model to the channel-split background feature map to estimate a pixel-wise depth feature map, and applies a channel shuffling operation to the estimated pixel-wise depth feature map and the channel-split background feature map, and mixes and then combines the estimated pixel-wise depth feature map and the channel-split background feature map to generate a final depth map.

4. The training data generation method of claim 1, wherein the step (d) comprises:
   determining an insertion location where the target object image is inserted into a space corresponding to the background image;
   scaling the target object image according to a depth value corresponding to the insertion location based on the depth map;
   inserting the scaled target object image into the insertion location in a space corresponding to the background image to generate the local object insertion image; and
   generating the mask image using the local object insertion image.

5. The training data generation method of claim 4, wherein the mask image has information about where and at what size the target object image is inserted into the background image.

6. The training data generation method of claim 1, wherein the step (d) is repeatedly performed according to different insertion locations and different scales.

7. The training data generation method of claim 1, wherein the multi-scale visual analysis model comprises a plurality of scale image generation blocks that receive an image obtained by up-sampling an image generated from a lower scale image generation block by r times, divide the received image into clusters with no pixel overlap, and then apply a self-attention operation to extract a cluster-level feature map, and apply a random mask to generate a scale generation image; and
   a plurality of discrimination blocks that adjust a weight of a generator block located in the scale image generation block to discriminate between a background image and the scale generation image down-sampled r times, and the multi-scale visual analysis module is pre-trained using the background image.

8. The training data generation method of claim 7, wherein the plurality of scale image generation blocks have image generation blocks and discrimination blocks for different scales, and the same-scale image generation blocks and discrimination blocks are composed of pairs.

9. The training data generation method of claim 7, wherein an N-order scale image generation block, which has a lowest resolution among the plurality of scale image generation blocks, receives an N-order random noise image $z_N$ and then generates an N-order generation image $\hat{x}_N$ similar to the background image, and
   a 0-order discrimination block with a highest resolution among the plurality of discrimination blocks adjusts the weight of the generator block within the 0-order scale image generation block using the background image and the 0-order scale generation image $\hat{x}_N$ that are not down-sampled.

10. The training data generation method of claim 9, wherein each of the plurality of scale image generation blocks comprises:
   a context attention block that receives a one-level lower scale generation image $\hat{x}_{n+1}^r$ and then applies a simple linear iterative clustering algorithm to divide the received one-level lower scale generation image $\hat{x}_{n+1}^r$ into clusters with no pixel overlap, applies a convolution operation within each cluster to perform embedding into a feature space, applies a K-proximity algorithm to perform clustering, and then sets a centroid vector of a t-th superpixel, performs feature aggregation with the number of clustered samples to calculate the aggregated centroid vector, and performs a self-attention operation and then transmits a feature of the centroid vector aggregated through a dispatching operation to each cluster by an element-wise sum to extract the cluster-level feature map;
   a random mask block that is located at a rear stage of the context attention block, receives the cluster-level feature map as an output of the context attention block, and then extracts a randomly masked feature map through patch embedding and random masking; and
   a target scale generator block that receives an image obtained by summing the masked feature map as the output of the random mask block and a target scale random noise image, extracts a target scale feature map, assigns a weight to each channel and locally important feature, and then sums the one-level lower scale generation image $\hat{x}_{n+1}^r$ to train a target scale feature.

11. The training data generation method of claim 1, wherein in the step (e),
   the simply synthesized image is down-sampled to an N-order scale, which is a preset lowest scale, and input to the trained multi-scale visual analysis model,
   the trained multi-scale visual analysis model receives an image down-sampled to the N-order scale, divides the received image into clusters with no pixel overlap, applies the self-attention operation to extract a target scale cluster-level feature map, and then generates a target scale synthesis image that reflects a target scale feature pre-trained for the background image, and
   the multi-scale visual analysis model up-samples the target scale synthesis image by r times and repeats the synthesis image generation process, but repeatedly performs the synthesis image generation process until the scale of the target scale synthesis image becomes the same as the background image.

12. A non-transitory computer-readable recording medium in which a program code for performing the method of claim 1 is recorded.

13. A computing device, comprising:
   a memory that stores at least one instruction; and
   a processor that executes the instruction stored in the memory,
   wherein each of the instructions executed by the processor performs:
   (a) receiving a background image and object-related information;
   (b) generating a target object image that meets a condition based on the object-related information;
   (c) applying the background image to a depth estimation model to estimate depths of each pixel location and generate a depth map;
   (d) determining an insertion location and scale at which the target object image is inserted based on the depth map to generate a local object insertion image and a mask image, respectively;
   (e) simply synthesizing the local object insertion image and the background image and then generating a synthesis image reflecting a scale feature of the background image through a trained multi-scale visual analysis model; and
   (f) generating a final training image using the background image, the synthesis image, and the mask image.

14. The computing device of claim 13, wherein the depth estimation model extracts a background feature map for the background image, applies a normalization layer to normalize the extracted background feature map, and then applies a channel splitting operation to split channels, respectively, applies a multi-layer perceptron neural network model to the channel-split background feature map to estimate a pixel-wise depth feature map, and applies a channel shuffling operation to the estimated pixel-wise depth feature map and the channel-split background feature map, and mixes and then combines the estimated pixel-wise depth feature map and the channel-split background feature map to generate a final depth map.

15. The computing device of claim 13, wherein the step (d) comprises:
   determining the insertion location where the target object image is inserted into a space corresponding to the background image;
   scaling the target object image according to a depth value corresponding to the insertion location based on the depth map;
   inserting the scaled target object image into the insertion location in a space corresponding to the background image to generate the local object insertion image; and
   generating the mask image using the local object insertion image.

16. The computing device of claim 13, wherein the multi-scale visual analysis model comprises:
   a plurality of scale image generation blocks that receive an image obtained by up-sampling an image generated from a lower scale image generation block by r times, divide the received image into clusters with no pixel overlap, and then apply a self-attention operation to extract a cluster-level feature map, and apply a random mask to generate a scale generation image; and
   a plurality of discrimination blocks that adjust a weight of a generator block located in the scale image generation block to discriminate between a background image and the scale generation image down-sampled r times, the multi-scale visual analysis module is pre-trained using the background image, and the plurality of scale image generation blocks have image generation blocks and discrimination blocks for different scales, and the same-scale image generation blocks and discrimination blocks are composed of pairs.

17. The computing device of claim 16, wherein an N-order scale image generation block, which has a lowest resolution among the plurality of scale image generation blocks, receives an N-order random noise image $z_N$ and then generates an N-order generation image $\hat{x}_N$ similar to the background image, and a 0-order discrimination block with a highest resolution among the plurality of discrimination blocks adjusts the weight of the generator block within the 0-order scale image generation block using the background image and the 0-order scale generation image $\hat{x}_0$ that are not down-sampled.

18. The computing device of claim 17, wherein each of the plurality of scale image generation blocks comprises:

a context attention block that receives a one-level lower scale generation image $\hat{x}_{n+1}^r$ and then applies a simple linear iterative clustering algorithm to divide the received one-level lower scale generation image $\hat{x}_{n+1}^r$ into clusters with no pixel overlap, applies a convolution operation within each cluster to perform embedding into a feature space, applies a K-proximity algorithm to perform clustering, and then sets a centroid vector of a t-th superpixel, performs feature aggregation with the number of clustered samples to calculate the aggregated centroid vector, and performs a self-attention operation and then transmits a feature of the centroid vector aggregated through a dispatching operation to each cluster by an element-wise sum to extract the cluster-level feature map;

a random mask block that is located at a rear stage of the context attention block, receives the cluster-level feature map as an output of the context attention block, and then extracts a randomly masked feature map through patch embedding and random masking; and a target scale generator block that receives an image obtained by summing the masked feature map as the output of the random mask block and a target scale random noise image, extracts a target scale feature map, assigns a weight to each channel and locally important feature, and then sums the one-level lower scale image $\hat{x}_{n+1}^r$ a target scale feature.

19. The computing device of claim 13, wherein in the step (e), the simply synthesized image is down-sampled to an N-order scale, which is a preset lowest scale, and input into the trained multi-scale visual analysis model, the trained multi-scale visual analysis model receives an image down-sampled to the N-order scale, divides the received image into clusters with no pixel overlap, applies the self-attention operation to extract a target scale cluster-level feature map, and then generates a target scale synthesis image that reflects a target scale feature pre-trained for the background image, and the multi-scale visual analysis model up-samples the target scale synthesis image by r times and repeats the synthesis image generation process, but repeatedly performs the synthesis image generation process until the scale of the target scale synthesis image becomes the same as the background image.

* * * * *